(12) United States Patent
Wageman (10) Patent No.: US 7,991,126 B1
(45) Date of Patent: Aug. 2, 2011

(54) METHOD FOR RESTRICTING MAILBOX-TO-MAILBOX MESSAGE TRANSFERS

(75) Inventor: Anthony J. Wageman, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1413 days.

(21) Appl. No.: 11/489,188

(22) Filed: Jul. 19, 2006

(51) Int. Cl.
*H04M 11/00* (2006.01)
*H04M 1/64* (2006.01)

(52) U.S. Cl. .................. 379/88.18; 379/88.23

(58) Field of Classification Search .......... 379/88.4, 379/88.19, 88.23, 88.25, 88.27, 88.28, 201, 379/230
See application file for complete search history.

(56) References Cited

U.S. PATENT DOCUMENTS

| | | | |
|---|---|---|---|
| 5,680,442 A | | 10/1997 | Bartholomew et al. |
| 5,812,639 A | | 9/1998 | Bartholomew et al. |
| 6,289,085 B1 | * | 9/2001 | Miyashita et al. .......... 379/88.02 |
| 6,330,308 B1 | * | 12/2001 | Cheston et al. ............ 379/88.04 |
| 6,424,702 B1 | | 7/2002 | Blumenschein et al. |
| 6,687,337 B2 | | 2/2004 | Blumenschein et al. |
| 2002/0168055 A1 | * | 11/2002 | Crockett et al. ........... 379/88.01 |
| 2003/0012348 A1 | | 1/2003 | Skladman et al. |
| 2003/0023692 A1 | | 1/2003 | Moroo |
| 2003/0076941 A1 | * | 4/2003 | Tiliks et al. .................. 379/196 |
| 2003/0165219 A1 | * | 9/2003 | Bedingfield et al. ....... 379/88.17 |
| 2004/0132438 A1 | | 7/2004 | White |
| 2004/0141592 A1 | | 7/2004 | Blumenschein et al. |
| 2004/0166878 A1 | | 8/2004 | Erskine et al. |
| 2005/0025298 A1 | * | 2/2005 | Finnigan .................... 379/88.22 |
| 2005/0259796 A1 | * | 11/2005 | Wallenius et al. ......... 379/93.01 |
| 2005/0282559 A1 | | 12/2005 | Erskine et al. |
| 2007/0297592 A1 | * | 12/2007 | Pearson ..................... 379/207.2 |

OTHER PUBLICATIONS

SymbianGear.com, http://www.symbiangear.com/product.html?pid=14585,14590,59602, printed from the World Wide Web on Jan. 30, 2006.
VoiceMail Connect, https://voicemail.ws/faq.cgi, printed from the World Wide Web on Jan. 30, 2006.
Solutions, Intelligent Message Filter™, http://www.avmob.com/av_solutions.htm, Avalanche Mobile, printed from the World Wide Web on Jan. 30, 2006.
Smart Mobs: Adding More Parental Control to Mobile Phones, http://www.smartmobs.com/archive/2004/03/29/adding_more_par.html, printed from the World Wide Web on Jan. 30, 2006.
Halfbakery: Instant Message Block, http://www.halfbakery.com/idea/instant_20message_20block, printed from the World Wide Web on Jan. 30, 2006.

* cited by examiner

*Primary Examiner* — Fan Tsang
*Assistant Examiner* — Solomon Bezuayehu (57) ABSTRACT

A method for use of voice call restriction data to restrict mailbox-to-mailbox message transfers. When a subscriber logs into his or her voice mail box and seeks to send a voice mail message to another subscriber's voice mail box, reference will be made to voice call restriction data that indicates whether voice calls are allowed between the subscriber and the other subscriber. If the voice call restriction data indicates that voice calls are allowed between the subscribers, then the voice mail system will allow the requested mailbox-to-mailbox message transfer. On the other hand, if the voice call restriction data indicates that voice calls are not allowed between the subscribers, then the voice mail system will not allow the mailbox-to-mailbox message transfer.

19 Claims, 5 Drawing Sheets

METHOD FOR RESTRICTING MAILBOX-TO-MAILBOX MESSAGE TRANSFERS

FIELD OF THE INVENTION

The present invention relates to telecommunications and, more particularly, to voice mail messaging systems.

BACKGROUND

In conventional voice mail systems, a voice mail server defines a mail box respectively for each telephone number, typically owned by or registered to a particular subscriber. When incoming calls to the telephone number are unanswered within a certain number of rings, they are directed to the voice mail server, allowing the caller to record a voice mail message for later retrieval by the subscriber.

A voice mail subscriber can typically access his or her voice mail box either from the telephone registered to the subscriber's telephone number or remotely from other telephones. Once the subscriber connects with his or her voice mail box, the subscriber may then manage the mail box, carrying out functions such as recording a personal greeting, reviewing message details (e.g., timestamps), listening to messages, and deleting messages.

In some instances, a person may wish to leave a voice mail message for another person without the need to call that other person's number. For example, if the other person is in a meeting or otherwise should not be disturbed with a phone call at the moment, it may be desirable to leave a voice mail message for the other person without actually calling the other person's number and causing the other person's phone to ring. To accommodate this desire, some voice mail systems allow a subscriber to generate and send a voice mail message from the subscriber's own voice mail box.

In particular, a subscriber may log into his or her own voice mail box and, through management prompts, may then opt to generate and send a voice mail message to a designated other subscriber. The voice mail system may then receive and record a voice mail message spoken by the subscriber and, responsive to the subscriber's request, may send the recorded voice mail message to the other subscriber's voice mail box for storage and later retrieval. A subscriber may use this process to generate and send a new voice mail message to another subscriber's mail box, perhaps as a reply to a voice mail message left by the other subscriber for the subscriber. Alternatively, a subscriber may use this process, perhaps without the recording step, to forward an existing voice mail message from the subscriber's voice mail box to the other subscriber's voice mail box.

Unfortunately, however, the ability to engage in mailbox-to-mailbox message transfers such as these can sidestep restrictions that may otherwise be in place regarding communications between subscribers. For instance, call processing restrictions may prevent a given subscriber from placing a voice call to another designated subscriber. Yet, with use of mailbox-to-mailbox transfer service, the given subscriber may nevertheless readily send a voice mail message to the other subscriber's mailbox. Therefore, an improvement is desired.

SUMMARY

The present invention is directed to a particular method for use of voice call restriction data to restrict mailbox-to-mailbox message transfers. When a subscriber logs into his or her voice mail box and seeks to send a voice mail message to another subscriber's voice mail box, reference will be made to voice call restriction data that indicates whether voice calls (i.e., real-time voice calls) are allowed between the subscriber and the other subscriber. If the voice call restriction data indicates that voice calls are allowed between the subscribers, then the voice mail system will allow the requested mailbox-to-mailbox message transfer. On the other hand, if the voice call restriction data indicates that voice calls are not allowed between the subscribers, then the voice mail system will not allow the mailbox-to-mailbox message transfer.

In accordance with an exemplary embodiment of the invention, the voice call restriction data will be maintained in an intelligent network entity such as a service control point (SCP) that normally maintains such data for use in processing voice call setup requests. The voice mail system may thus send a query to the SCP, using Session Initiation Protocol (SIP), IDSN User Part (ISUP) or some other signaling protocol, and the SCP may reference the voice call restriction data and then provide a response to the voice mail system. Further, at some other time, the same voice call restriction data may be used to determine whether to allow a voice call to be placed between the first subscriber and the second subscriber.

Also in accordance with the exemplary embodiment, before the voice mail system determines, based on the voice call restriction data, whether to allow the mailbox-to-mailbox message transfer, the voice mail system may query a set of subscriber profile data to determine whether the first subscriber and/or second subscriber subscribes to a message transfer restriction service. Further, in a scenario where the first voice mail box and second mailbox are maintained at separate voice mail platforms, the voice mail platform that maintains the first mail box may communicate with the voice mail platform that maintains the second voice mail box in order to ensure that the second voice mail box in fact exists, before the first voice mail platform sends the voice mail message to the second voice mail platform.

These as well as other aspects, advantages and alternatives will become apparent to those of ordinary skill in the art by reading the following detailed description with reference where appropriate to the accompanying drawings. Further, it should be understood that this summary and the following description are intended to illustrate the invention by way of example only.

DETAILED DESCRIPTION

Referring to the drawings, as noted above, FIG. 1 is a flow chart depicting a process carried out in accordance with an exemplary embodiment of the present invention. As shown at step 12, the process first involves, in a voice mail system, connecting a first subscriber with a first voice mail box associated with the first subscriber. At step 14, the process then involves receiving from the first subscriber, through the first voice mail box, a request to send a voice mail message to a second voice mail box associated with a second subscriber. At step 16, the process then involves determining whether voice call restriction data indicates that voice calls between the first subscriber and the second subscriber are allowed.

Figure 1:
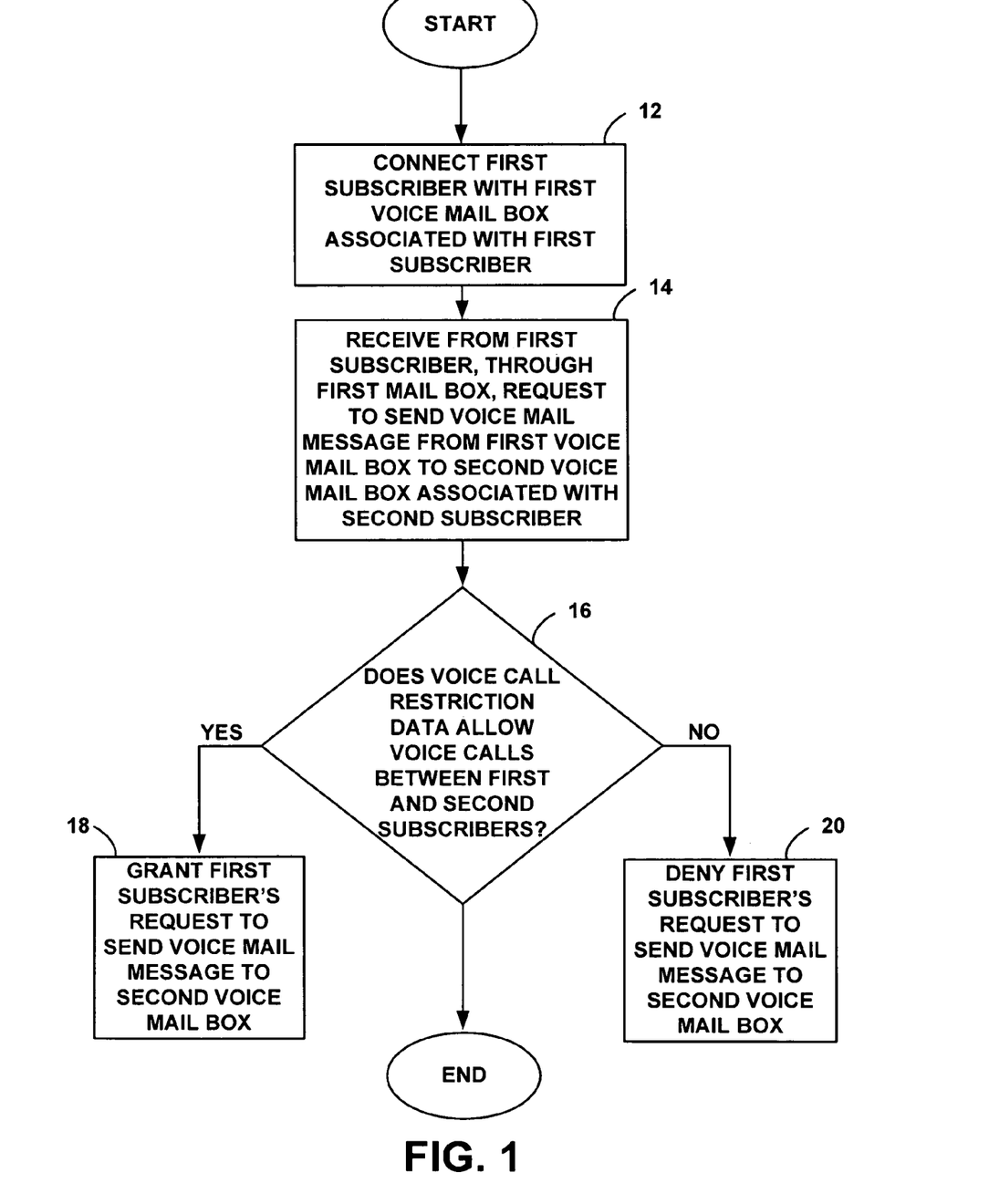
FIG. 1 is a flow chart depicting functions carried out in accordance with an exemplary embodiment of the invention.

If voice call restriction data indicates that voice calls between the first subscriber and the second subscriber are allowed, then, at step 18, the process next involves granting the first subscriber's request to send the voice mail message to the second voice mail box associated with the second subscriber. On the other hand, if the voice call restriction data indicates that voice calls between the first subscriber and the second subscriber are not allowed, then, at step 20, the process next involves denying the first subscriber's request to send the voice mail message to the second voice mail box associated with the second subscriber.

Figure 2:
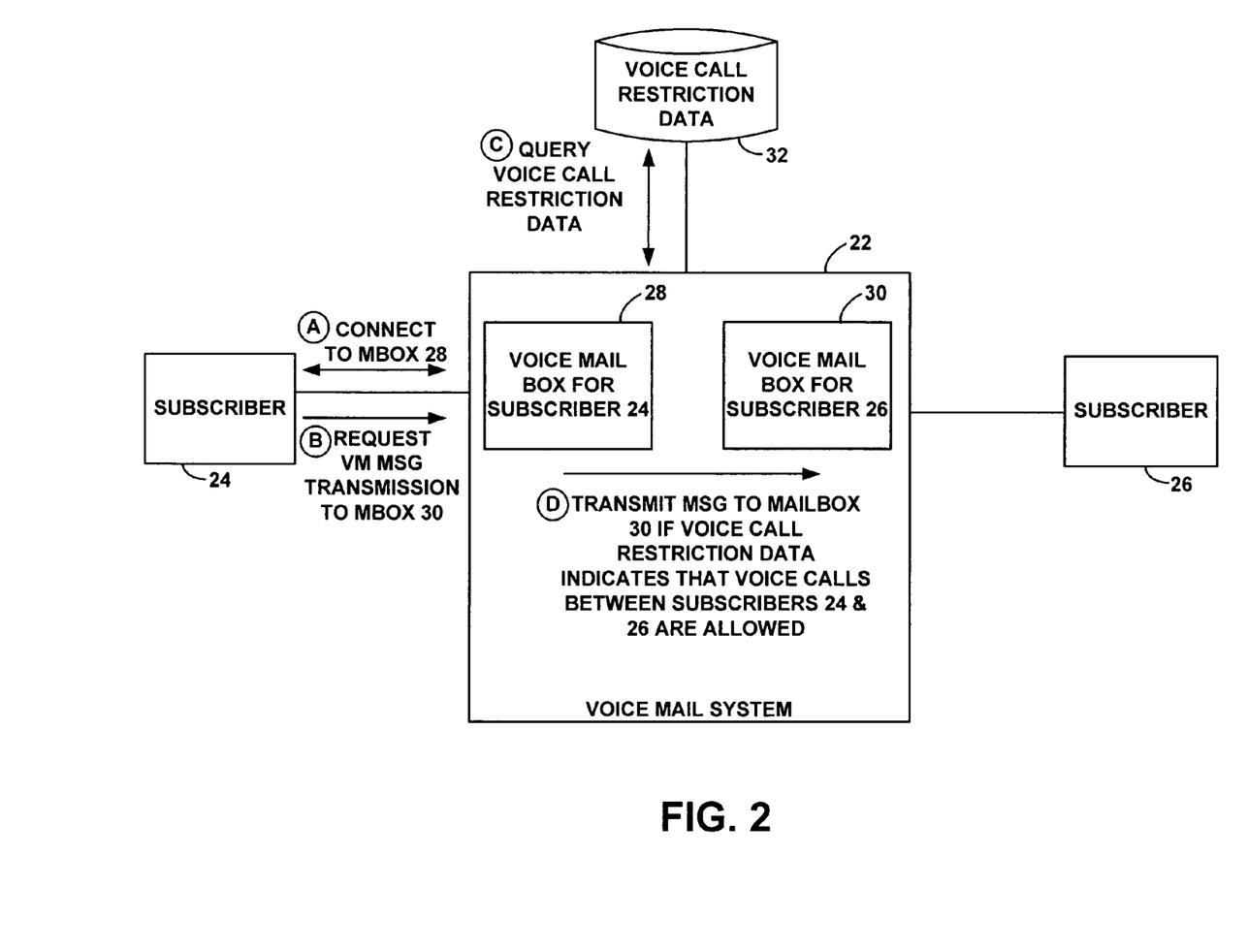
FIG. 2 is a simplified block diagram depicting a network arrangement in which the exemplary embodiment can be carried out.

FIG. 2 is a simplified block diagram depicting a network arrangement in which the exemplary embodiment can be implemented. As shown in FIG. 2, the network arrangement includes a voice mail system 22, a first subscriber 24, and a second subscriber 26. The voice mail system 22 includes at least a first voice mail box 28 associated with (i.e., defined for) the first subscriber 24 and a second voice mail box 30 associated with (i.e., defined for) the second subscriber 26. As further shown, the network arrangement includes voice call restriction data 32, which indicates whether voice calls are allowed to be placed between the first subscriber and the second subscriber.

In this arrangement, at step A, the first subscriber connects with first voice mail box 28, such as by calling or otherwise logging into the first voice mail box 28. At step B, through the first voice mail box 28, the voice mail system 22 then receives from the connected first subscriber a request to send a voice mail message to the second voice mail box 30, for receipt by the second subscriber 26. In response, at step C, the voice mail system 22 or other entity queries the voice call restriction data 32 to determine whether voice calls are allowed to be placed between the first subscriber and the second subscriber. At step D, if the voice call restriction data 32 indicates that voice calls are allowed to be placed between the first subscriber and the second subscriber, then the voice mail system 22 then sends a voice mail message (e.g., new, reply, or forward) from the first voice mail box to the second voice mail box as requested.

It should be understood that the arrangements and functions depicted in FIGS. 1 and 2 and elsewhere throughout this document are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software, such as by one or more processors programmed with machine language instructions executable to carry out the functions.

Figure 3:
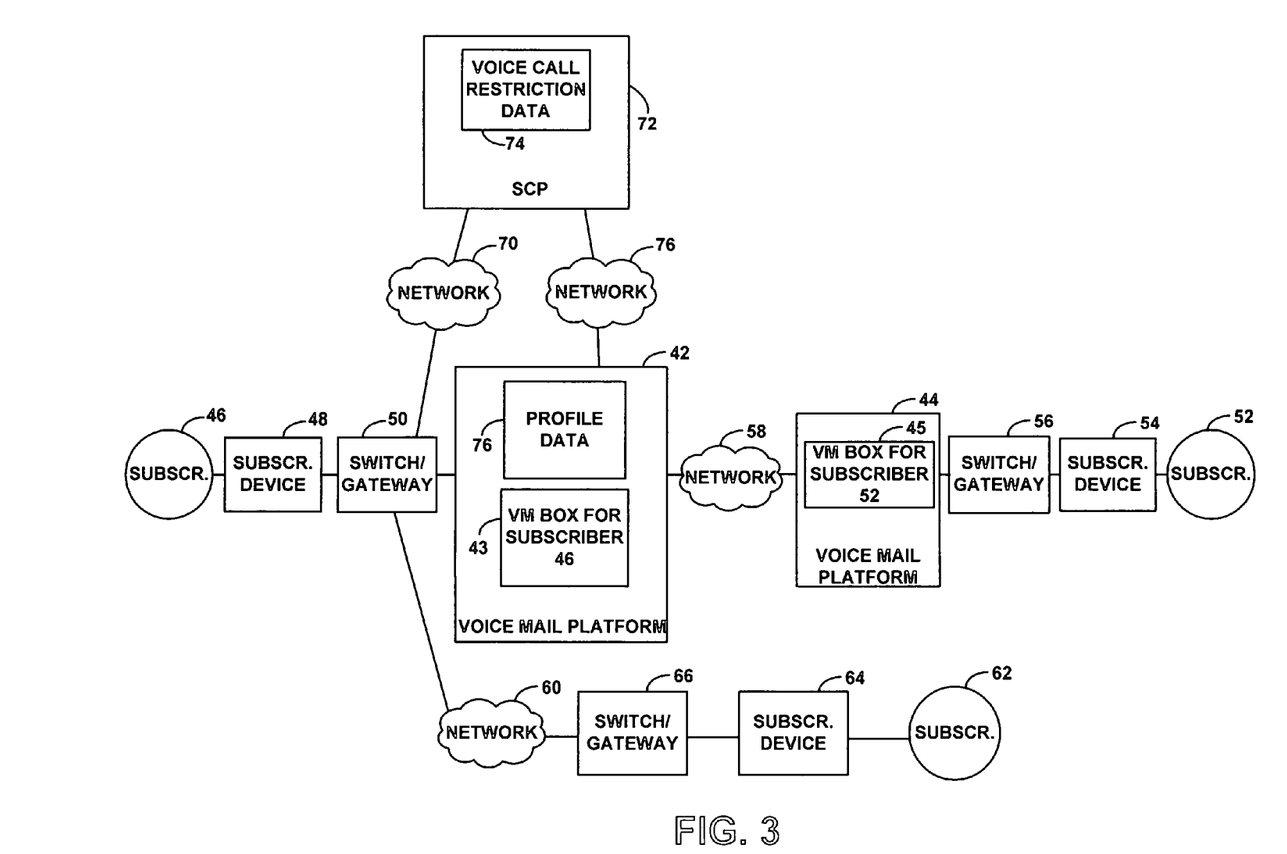
FIG. 3 is a more detailed block diagram depicting a network arrangement in which the exemplary embodiment can be carried out.

FIG. 3 next depicts in more detail a network arrangement in which the exemplary embodiment can be implemented. As shown, the network arrangement includes a voice mail system comprising at least a first voice mail platform 42 and a second voice mail platform 44. Each voice mail platform may comprise one or more voice mail servers, hosting one or more voice mail boxes for one or more subscribers.

The voice mail platforms 42, 44 may or may not be commonly owned and operated. For example, the voice mail platforms may both be owned by a given telecommunications carrier (e.g., wireless and/or landline telephone service provider) and located at geographically dispersed points throughout the carrier's network. As another example, one voice mail platform may be owned and operated by one carrier, and the other voice mail platform may be owned and operated by another carrier. Still further, either or both voice mail platforms may be owned and operated by an entity other than a telecommunications carrier. For instance, either voice mail platform may be a private voice mail system, such as an corporate voice mail server or personal voice mail server/software.

As further shown, a first subscriber 46 operates a first subscriber device 48 to communicate via a first switch or gateway 50 with the first voice mail platform 42, and the first voice mail platform 42 hosts at least a first voice mail box 43 for the first subscriber 46. Further, a second subscriber 52 operates a second subscriber device 54 to communicate via a second switch or gateway 56 with the second voice mail platform 44, and the second voice mail platform 44 hosts at least a second voice mail box 45 for the second subscriber 52. The two voice mail platforms are then communicatively linked together via a network 58 or direct link, to facilitate exchange of signaling and voice mail messages between the platforms, such as between voice mail boxes 43 and 45. Network 58 may be an IP network, a Signaling System #7 (SS7) network, and/or any other sort of network now known or later developed.

Subscriber devices 48, 56 and switch/gateways 50, 56 may take any of a variety of forms, thus providing subscribers 46, 52 with connections to voice mail platforms 42, 44 through any of a variety of mechanisms, whether circuit-switched, packet-switched, landline, and/or wireless. For example, subscriber device 48 may be a cellular telephone, and switch/gateway 50 may be a mobile switching center (MSC) within a radio access network (RAN) with which device 48 communicates over an air interface. As another example, subscriber device 48 may be a landline telephone, and switch/gateway 50 may be a landline telecommunications switch with which device 48 communicates via a local loop telephone line. Further, as another example, subscriber device 48 may be a personal computer, and switch/gateway may be a interne service provider gateway with which device 48 communicates via a landline and/or wireless link. Other examples are possible as well.

Each switch/gateway 50, 56 may provide connectivity between subscriber devices and one or more transport networks, to allow the subscribers to communicate with each other via the transport networks. By way of example, as shown, switch/gateway 50 may connect subscriber device 48 with a network 60, such as the public switched telephone network (PSTN) or the Internet for instance, so that subscriber 46 can communicate via the network 60 with another subscriber 62 operating another subscriber device 64 served by another switch/gateway 66. For instance, subscriber devices 48, 64 may be telephones, each served by a respective PSTN switch 50, 66. Subscriber 46 may operate subscriber device 48 to place a PSTN call to subscriber device 64, and switch/gateways 50, 66 may connect the call via network 60.

In the arrangement shown, switch/gateway 50 is further coupled by a network 70 with a service control point (SCP) 72 or similar control point, which functions in a well known manner to provide intelligent network call processing guidance for switch/gateway 50 and typically for numerous other switches/gateways. Network 70 may be an IP network, an SS7 network, or another sort of network, arranged in a well known manner.

SCP 72 normally includes or has access to a set of voice call restriction data 74, to which the SCP 72 may refer when determining how switch/gateway 50 should set up calls to or from subscriber device 48 or others. The voice call restriction data 74 may be provisioned into SCP 72 through conventional provisioning techniques and may indicate, respectively for each of a plurality of subscribers, whether voice calls are allowed to be connected between the subscriber and particular other subscribers. The voice call restriction data may be keyed to subscribers by subscriber ID, such as telephone number or network address for instance. Further, the voice call restriction data may be set forth as part of a more complete subscriber service profile each the subscriber.

In practice, the voice call restriction data 74 can be arranged in any of a variety of ways. For example, the data may define a whitelist of other subscribers to whom the subscriber is allowed to place calls and from whom the subscriber is allowed to receive calls. Or the data may define a blacklist of other subscribers to whom the subscriber is not allowed to place calls or from whom the subscriber is not allowed to receive calls. Further, the data may indicate voice call restrictions by time, such as by indicating given times of day (e.g., time ranges) in which calls are allowed or not allowed between particular subscribers, such that at some times the data may indicate that voice calls between particular subscribers are allowed, while at other times the data may indicate that voice calls between those subscribers are not allowed. Still further, the voice call restriction data may indicate voice call restrictions by classifications of subscribers, such as by area code, prefix, device type, service class, or other classification.

As used herein, the term "voice call" includes any sort of real-time network based voice communication between two or more parties, as contrasted with asynchronous message transfer such as voice mail messaging or e-mail messaging. As such, voice calls may include traditional PSTN voice calls, packet-based voice calls (e.g., voice over IP (VoIP) calls), and any other types of voice calls now known or later developed. Further, a voice call can include communication of additional media, such as video or text, as well.

In normal practice, as noted above, voice call restriction data 74 is used to guide voice call processing, typically through well known intelligent network processing techniques. For instance, when switch/gateway 50 receives a request from subscriber device 48 to connect a call to subscriber device 64, switch/gateway 50 may pause call processing and send Transaction Capabilities Application Part (TCAP) request message, such as an IS-41 Origination_Request (ORREQ) message, or some other sort of request message, via network 70 to SCP 72, providing SCP 72 with subscriber identifiers (e.g., telephone numbers) of the calling and called parties. SCP 72 may then responsively reference voice call restriction data 74 to determine (based on the calling and/or called numbers) whether a call from subscriber device 48 to subscriber device 64 is allowed (e.g., currently allowed). If so, SCP 72 may then send a TCAP response message, such as an IS-41 origination_request return result (orreq_rr) message, via network 70 to switch/gateway 50, directing switch/gateway 50 to connect the call, and switch/gateway 50 may then responsively connect the call. Alternatively, if SCP 72 determines by reference to voice call restriction data 74 that a call from subscriber device 48 to subscriber device 64 is not allowed (e.g., not currently allowed), then SCP 72 may direct switch/gateway 50 to block the call, and switch/gateway 50 may responsively block the call.

In accordance with the exemplary embodiment, when voice mail platform 42 receives a request from subscriber 46 to send a voice mail message from voice mail box 43 (associated with subscriber 46) to voice mail box 45 (associated with subscriber 52), reference will be made to voice call restriction data 74 as a basis to determine whether to allow the requested mailbox-to-mailbox message transfer.

A convenient way to do this in practice is to have voice mail platform 42 query SCP 72 in much the same way that a switch/gateway 50 would query the SCP at some other time for voice call processing guidance. To facilitate this, voice mail platform 42 is preferably arranged to communicate with SCP 72 via a network 76. Network 76 may be network 70 or may be another network, also perhaps an IP network, SS7 network or other sort of network. (In an alternative embodiment, note that some or all of the functions of SCP 72 can be integrated with the voice mail platform 42.)

To work seamlessly with the existing, logical arrangement of SCP 72, voice mail platform 42 may be programmed to send a TCAP message, such as an IS-41 ORREQ message, to SCP 72, providing the SCP with subscriber identifiers of the "calling" and "called" parties. In this case, the "calling" subscriber would be the subscriber from whose voice mail box the voice mail message is to be sent, and the "called" subscriber would be the subscriber to whose voice mail box the voice mail message is to be sent. Conveniently, the SCP 72 may then refer to the voice call restriction data as normal and make a determination whether a voice call between the designated parties is allowed, and the SCP 72 may send a response message, such as an IS-41 orreq_rr message, to the voice mail platform, indicating whether or not to allow the "call." In accordance with the invention, the voice mail platform 42 may then accordingly allow or disallow the requested mailbox-to-mailbox message transfer.

Alternatively, it is possible that SCP 72 may be programmed to engage in other sorts of signaling communications, such as well known Session Initiation Protocol (SIP) communication for instance. In that case, voice mail platform 42 may be programmed with SIP client logic that enables it to to send a SIP message, such as a SIP INVITE message, to SCP 72, similarly providing SCP 72 with identification of the parties at issue. And SCP 72 may similarly refer in response to voice call restriction data 74 to determine whether voice calls are allowed between the parties and may then send a response SIP message to voice mail platform 42 indicating whether or not to allow the requested communication, in this case a mailbox-to-mailbox message transfer. If the communication is allowed, the response message may be a SIP 200 OK message. Whereas, if the communication is not allowed, the response message may be a SIP 403 FORBIDDEN message. Other messaging could be used as well.

To help further direct the SCP 72 to check the voice call restriction data, voice mail platform 42 may include in its signal to SCP 72 a "Check Restriction" parameter value. For instance, in a TCAP message, the voice mail platform 42 may include such as parameter value in a user-definable field of the TCAP message, and the SCP 72 may respond to the presence of that parameter value specifically by checking the voice call restriction data 74 to determine whether a voice call between the designated parties is allowed. Similarly, in a SIP message, the voice mail platform 42 may include such a parameter value in a user-definable header field, such as in a Session Description Protocol (SDP) header field for instance, and the SCP 72 may similarly respond.

In the arrangement of FIG. 3, if voice mail platform 42 thereby determines, based on the voice call restriction data, that the mailbox-to-mailbox message transfer is allowed, voice mail platform 42 may then transmit the voice mail message from voice mail box 43 (associated with the requesting subscriber 46) via network 58 to voice mail platform 44 for storage in voice mail box 45 (associated with subscriber 52).

More particularly, after thereby determining that the mailbox-to-mailbox message transfer is allowed, voice mail platform 42 may prompt subscriber 46 to speak a voice mail message for subscriber 52, voice mail platform 42 may then receive and record the spoken voice mail message from subscriber 46 and may transmit the recording via network 58 to voice mail platform 44 for storage in voice mail box 45. Alternatively, if the voice mail message at issue already exists in voice mail box 43 (associated with the requesting subscriber 46), voice mail platform 42 may forego the steps of prompting for and receiving the message (or may still prompt for and receive an introductory message) but may simply transmit the existing voice mail message to voice mail platform 44 for storage in voice mail box 45. In any case, voice mail platform 44 may then alert subscriber 52 of the message, and subscriber 52 may responsively retrieve the message from voice mail box 45.

As presently contemplated, voice mail platform 42 may carry out this process selectively only for voice mail subscribers who subscribe to a voice mail message transfer restriction service. For instance, a parent may subscribe a child to such a service in order to prevent undesired mailbox-to-mailbox message transfers to or from the child. To limit operation of the process in this manner, voice mail platform 42 may include or have access to a set of profile data 76, which may define which subscriber(s) subscribe to the voice mail message transfer restriction service. This profile data 76 may be provisioned using any well known service provisioning mechanism now known or later developed, and the profile data may take any of a variety of forms.

To avoid unnecessary signaling between voice mail platform 42 and SCP 72 when voice mail platform receives a mailbox-to-mailbox message transfer request, voice mail platform 42 may reference profile data 76 before voice mail platform 42 signals to SCP 72 to determine whether to allow the requested message transfer. In particular, upon receipt of a mailbox-to-mailbox message transfer request from subscriber 46, voice mail platform 42 may first query profile data 76 to determine whether subscriber 46 (e.g., subscriber device 48) subscribes to the voice mail message transfer restriction service. If the voice mail platform 42 thereby determines that subscriber 46 does not subscribe to such a service, then the voice mail platform 42 may allow the requested transfer to proceed. Alternatively, if the voice mail platform 42 determines that subscriber 46 subscribes to such a service, then the voice mail platform 42 may carry out the other functions described herein.

Furthermore, at some point before voice mail platform 42 transfers a voice mail message via network 58 to voice mail platform 44, voice mail platform 42 may advantageously engage in signaling communication with voice mail platform 44 (e.g., via an IP network, SS7 network, or some other network) to validate the destination voice mail box, i.e., to determine whether the destination voice mail box in fact exists. Preferably, voice mail platform 42 will perform this check after determining that the requesting subscriber subscribes to the voice mail transfer restriction service and before prompting the requesting subscriber to record the voice mail message to be transferred. But voice mail platform 42 can perform this check at some other time as well.

The messaging that passes between the voice mail platforms to facilitate this check can take any agreed form, such as SS7, SIP, HTTP, or other types of messaging now known or later developed, and the voice mail platforms would be programmed respectively with logic to engage in this communication with each other. As a specific example, the platforms may engage in IMAP4 communication with each other, through which voice mail platform 42 may receive from voice mail platform 44 a name announcement for the destination voice mail box, so that voice mail platform 42 can both validate the existence of the destination voice mail box and also obtain the name announcement to play out to the requesting subscriber as a prompt or acknowledgement. For instance, voice mail platform 42 may send an IMAP4 Fetch message to voice mail platform 44, requesting the name announcement associated with the destination voice mail box. If the destination voice mail box exists and is available to receive a message transfer, voice mail platform 44 may then respond to voice mail platform 42 with an IMAP 4 OK Fetch message providing a recording of the associated name announcement.

Figure 4:
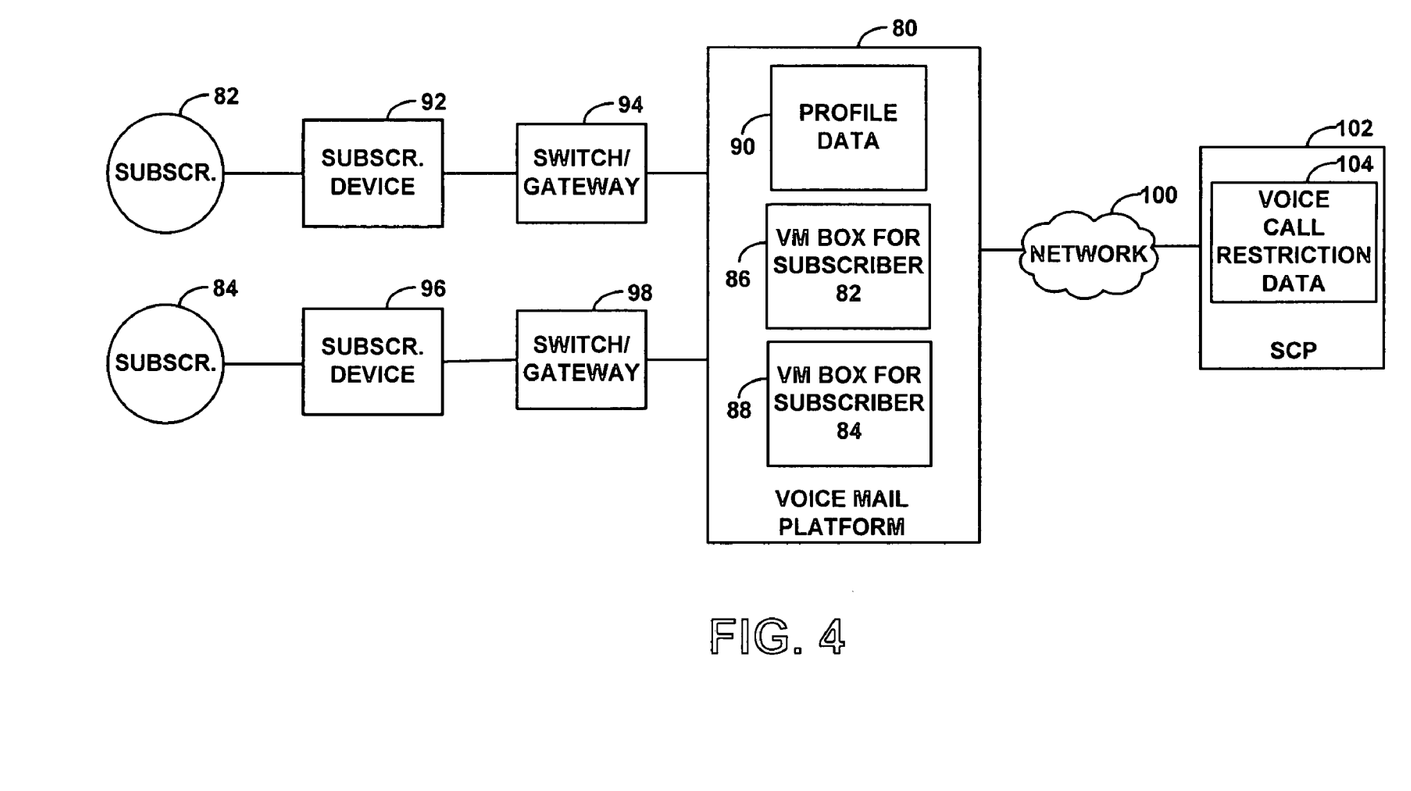
FIG. 4 is a block diagram of an alternative network arrangement in which the exemplary embodiment can be carried out.

Although FIG. 3 depicts the originating and destination voice mail boxes as residing on separate voice mail platforms, it is equally possible that the voice mail boxes may reside on a common voice mail platform. FIG. 4 depicts this alternative arrangement.

As shown in FIG. 4, a voice mail platform 80 serves a plurality of subscribers, such as a first subscriber 82 and a second subscriber 84. Voice mail platform 80 maintains at least a first voice mail box 86 associated with (i.e., defined for) subscriber 82 and a second voice mail box 88 associated with (i.e., defined for) subscriber 84. Further, voice mail platform 80 includes or has access to profile data 90, which identifies subscribers to the voice mail message transfer restriction service. As illustrated, subscriber 82 operates a first subscriber device 92, which communicates via a first switch/gateway 94 with voice mail platform 80, and subscriber 84 operates a second subscriber device 96, which communicates via a second switch/gateway 98 with voice mail platform 80. Voice mail platform 80 is in turn linked via a network 100 with an SCP 102, which maintains voice call restriction data 104 for use in governing setup of voice calls.

In this arrangement, when voice mail platform 80 receives a request from subscriber 82 to transfer a voice mail message from voice mail box 86 (associated with subscriber 82) to voice mail box 88 (associated with subscriber 84), voice mail platform 80 may query profile data to determine whether either or each subscriber subscribes to a voice mail message transfer restriction service and, if so, may then query SCP 102 via network 100 to determine, based on voice call restriction data 104, whether to allow the requested message transfer. If the voice mail platform 80 thereby determines that the message transfer should be allowed, the voice mail platform 80 may then simply transfer the voice mail message from voice mail box 86 to voice mail box 88.

In view of these and other various arrangements, it should be understood that the act of sending, transferring, or otherwise providing a voice mail message from one voice mail box to another can take various forms. By way of example, the act may involve transmitting a recording of the voice mail message (e.g., as a WAV, MP3, or other sort of audio file) over a network or direct communication link (whether wired or wireless) from one network entity maintaining the originating voice mail box to another network entity maintaining the destination voice mail box. As another example, the act may involve storing or publishing the voice mail message in some accessible location, and sending to the destination voice mail box—or simply recording in association with the destination voice mail box—a pointer to the storage location of the voice mail message.

Various protocols, such as HTTP, SMTP, or FTP, can be used to transfer a voice mail message or pointer from one voice mail box to another. For instance, an originating voice platform may send the voice mail message with an SMTP Message Deposit message to the destination voice mail platform, after which the destination platform may return an SMTP 221 Closing Channel message. Other examples are possible as well.

Furthermore, the act of connecting a requesting subscriber with his or her voice mail box in the first place, and the act of then receiving a voice mail message transfer request from the subscriber through the subscriber's voice mail box, may also take various forms. In one embodiment, for instance, the subscriber may place a voice call to the voice mail platform, by dialing a direct number provided for accessing the voice mail platform. Once connected with the platform, the subscriber may then navigate through a voice/DTMF menu provided by the platform, to enter the subscriber's extension and a password. In response, the platform may then logically connect the subscriber with the subscriber's voice mail box and provide the subscriber with an interactive voice response navigation structure through which the subscriber can manage the voice mail box and carry out other functions such as to request a voice mail message transfer.

If the voice mail message transfer is allowed, the subscriber may then speak a voice mail message, which the platform may record for transfer to another designated subscriber's voice mail box, or the subscriber may designate an existing voice mail message to be transferred. Alternatively, if the voice mail message transfer is not allowed, the voice mail platform may play an announcement to the subscriber indicating that the message transfer request is denied.

In another embodiment, a subscriber may connect to his or her voice mail box through a web (Internet) based interface. For instance, the subscriber may operate a personal computer or other web-capable device (e.g., a wireless-web based personal digital assistant) and may browse to a designated web page hosted by the voice mail platform (as a web server) or by another associated web server that functions as a front end to the voice mail platform. Through the web page, the subscriber may enter his or her number and password to connect with his or her voice mail box. Once the subscriber is thus connected, the voice mail platform may provide the subscriber with an analogous set of options to manage the subscriber's voice mail box, including an option to request a voice mail message transfer.

If the voice mail message transfer is allowed, the subscriber may type a message, which the voice mail platform may convert into speech (applying a text-to-speech software engine) for transmission to the destination voice mail box, or the subscriber may designate an existing voice mail message to be transferred. On the other hand, if the voice mail message transfer is not allowed, the web server may deliver a web page to the subscriber indicating that the requested transfer is denied. Still other connection, request, and interaction methods may be possible as well.

As discussed above, a voice mail message transfer request from a subscriber may itself take various forms. In one arrangement, for instance, the request may comprise a compose-and-send request, by which the subscriber seeks to record a voice mail message to be transferred to and stored in the second voice mail box. In that case, the function of granting the request may then involve (i) prompting the subscriber to enter (e.g., speak) the voice mail message, (ii) receiving the voice mail message from the subscriber, and (iii) providing (e.g., sending) the received voice mail message to the destination voice mail box. As another example, the request may comprise a message-forward request, by which the subscriber seeks to forward an existing voice mail message from the subscriber's voice mail box to the destination voice mail box. And as another example, the request may comprise a send-reply request, which is largely a compose-and-send request but specifically for generating a reply to an existing voice mail message in the subscriber's voice mail box.

Figure 5:
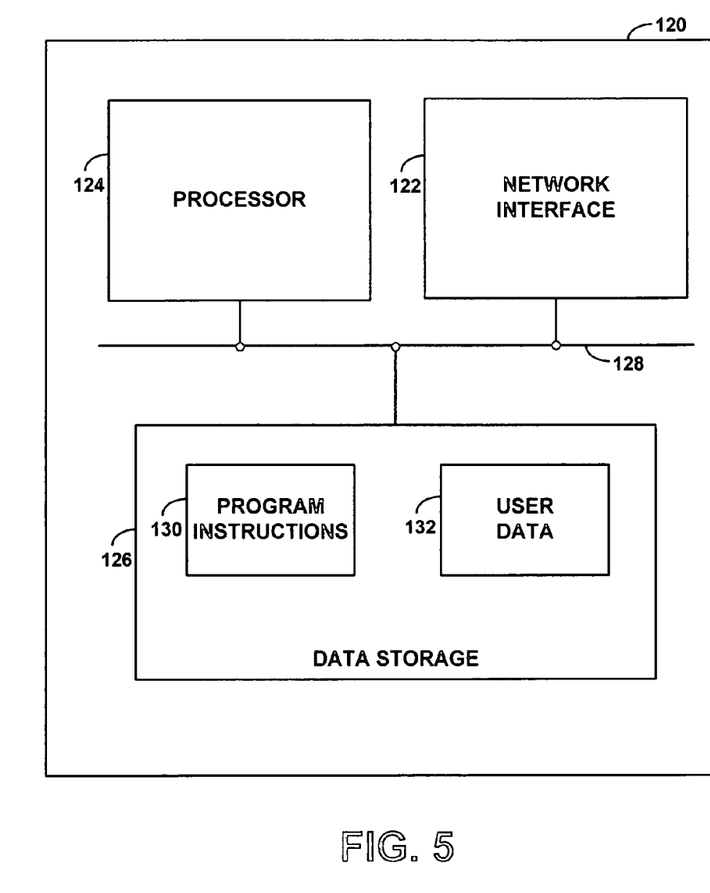
FIG. 5 is a block diagram of a voice mail platform arranged to carry out aspects of the exemplary embodiment.

FIG. 5 is next a block diagram of an exemplary voice mail platform 120 arranged to implement aspects of the invention, corresponding to voice mail platform 42 or voice mail platform 80 described above for instance. As shown, voice mail platform 120 may comprise a network interface 122, a processor 124, and data storage 126, all of which may be coupled together by a system bus, network, or other mechanism, 128. Further, these components may be integrated together in a single entity, such as on a single chassis or as part of a single computer server, or the components may be separate and connected together.

Network interface 122 may comprise one or more landline or wireless connection interfaces allowing voice mail platform 120 to engage in communication over one or more networks, such as communication with one or more switch/gateways serving subscribers, communication with an SCP or other entity maintaining voice call restriction data, and communication with one or more other voice mail platforms. As such, network interface 122 may comprise an Ethernet interface or other interface of a form now known or later developed.

Processor 124 may comprise one or more general purpose processors (e.g., INTEL microprocessors) and/or one or more special purpose processors (e.g., digital signal processors). Data storage 126, in turn, may comprise one or more storage mechanisms, such as magnetic, optical, or organic storage, and may be integrated in whole or in part with processor 124.

In the exemplary embodiment, data storage 126 holds program logic 130 and user data 132. Program logic 130 may include machine language instructions executable by processor 124 to carry out various functions described herein, such as to define and facilitate management of voice mail boxes for subscribers, to facilitate interaction with subscribers such as to receive and respond to voice mail message transfer requests as described above, and to carry out other associated functions. User data 132 may then define the data stored in association with voice mail boxes, such as user-specific mailbox prompts, voice mail messages, and the like. Further, user data 132 may define the profile data described above, as well as any other user-specific data.

Thus, in practice, when voice mail platform 120 receives a voice mail message transfer request from a subscriber, voice mail platform 120 may execute machine language instructions to carry out the functions described above, so as to determine based on voice call restriction data whether to allow the requested message transfer. If the voice mail platform 120 thereby determines that the requested voice mail message transfer is allowed, the voice mail platform 120 may carry out the transfer. On the other hand, if the voice mail platform 120 thereby determines that the requested voice mail message transfer is not allowed, the voice mail platform may deny the request.

An exemplary embodiment has been described above. It should be understood, however, that variations from the embodiment discussed are possible, while remaining within the true spirit and scope of the invention as claimed. For instance, although the foregoing description focuses on reference to an SCP, the described functionality can be equally carried out in more advanced packet-switched networks, such as in an IP Multimedia Subsystem (IMS) arrangement. In that case, a home subscriber store (HSS), rather than or in addition to the SCP as described above, may be provisioned with voice call restriction data, and the voice mail platform may query the HSS when deciding whether to allow a requested voice mail message transfer to occur.

Other variations are possible as well.

I claim:

1. A method comprising
(a) in a voice mail system, connecting a first subscriber to a first voice mail box associated with the first subscriber;
(b) through the first voice mail box, receiving into the voice mail system from the first subscriber a request for the voice mail system to send a voice mail message to a second voice mail box associated with a second subscriber; and
(c) responsive to the request, (i) determining whether voice call restriction data indicates that voice calls between the first subscriber and the second subscriber are allowed by sending a Check Restriction Header Parameter to a SCP (Service Control Point), (ii) granting the first subscriber's request to send the voice mail message to the second voice mail box associated with the second subscriber if the voice call restriction data indicates that voice calls are allowed and if the second mailbox exists, and (iii) denying the first subscriber's request to send the voice mail message to the second voice mail box associated with the second subscriber if the voice call restriction data indicates that voice calls between the first subscriber and the second subscriber are not allowed.

2. The method of claim 1, wherein the voice call restriction data resides at a service control point (SCP), and wherein determining whether the voice call restriction data indicates that voice calls between the first subscriber and the second subscriber are allowed comprises:
providing a query from the voice mail system to the SCP;
the SCP responsively referencing the voice call restriction data to determine whether the voice call restriction data indicates that voice calls between the first subscriber and the second subscriber are allowed; and
providing a response from the SCP to the voice mail system.

3. The method of claim 2, wherein providing the query comprises providing the query in a Session Initiation Protocol (SIP) message via a packet-switched network connection.

4. The method of claim 3, wherein the SIP message contains a check-restriction parameter, the SCP detecting the check-restriction parameter and responsively carrying out the referencing function in response to the query.

5. The method of claim 1,
wherein the voice mail system comprises a first voice mail platform serving the first voice mail box and a second voice mail platform serving the second voice mail box, and
wherein granting the first subscriber's request to send the voice mail message to the second voice mail box associated with the second subscriber comprises sending the voice mail message over a network connection from the first voice mail platform to the second voice mail platform, for storage of the voice mail message in the second voice mail box.

6. The method of claim 5, further comprising:
before sending the voice mail message from the first voice mail platform to the second voice mail platform, the first voice mail platform communicating with the second voice mail platform to validate the second voice mail box.

7. The method of claim 6, wherein communicating with the second voice mail platform to validate the second voice mail box comprises communicating with the second voice mail platform to determine whether the second voice mail box exists.

8. The method of claim 1, wherein connecting the first subscriber with the first voice mail box associated with the first subscriber comprises:
receiving a call from the first subscriber to the voice mail system, and connecting the first subscriber with an interactive voice response system through which the first subscriber is able to manage the first voice mail box.

9. The method of claim 1, wherein connecting the first subscriber with the first voice mail box associated with the first subscriber comprises:
receiving via a web interface a request from the first subscriber to connect with the first subscriber's voice mail box, and connecting the first subscriber with a web-based interface with the first voice mail box.

10. The method of claim 1, wherein:
the request for the voice mail system to send the voice mail message to the second voice mail box associated with the second subscriber comprises a compose-and-send request.

11. The method of claim 10, wherein granting the first subscriber's request to send the voice mail message to the second voice mail box associated with the second subscriber comprises, in order:
prompting the first subscriber to enter the voice mail message;
receiving the voice mail message from the first subscriber; and
providing the received voice mail message to the second voice mail box.

12. The method of claim 1, wherein:
the request for the voice mail system to send the voice mail message to the second voice mail box associated with the second subscriber comprises a message-forward request.

13. The method of claim 1, wherein:
the request for the voice mail system to send the voice mail message to the second voice mail box associated with the second subscriber comprises a send-reply request.

14. The method of claim 1, wherein granting the request comprises:
storing in association with the second voice mail box a pointer to the voice mail message, to facilitate subsequent retrieval of the voice mail message by the second subscriber.

15. The method of claim 1, further comprising:
maintaining in data storage at the voice mail system profile data indicating for each of a plurality of subscribers whether the subscriber subscribes to a message transfer restriction service; and
carrying out step (c) only if the profile data indicates that at least one of the first subscriber and the second subscriber subscribes to the message transfer restriction service.

16. The method of claim 1, further comprising:
at another time, using the voice call restriction data to determine whether to allow a voice call to be placed from the first subscriber to the second subscriber.

17. The method of claim 16, wherein using the voice call restriction data to determine whether to allow a voice call to be placed from the first subscriber to the second subscriber comprises:
a switch receiving a request to place the voice call;
the switch querying to a service control point (SCP) that maintains the voice call restriction data; and the SCP referencing the voice call restriction data to determine whether to allow the voice call, and the SCP instructing the switch accordingly.

18. A method comprising:

maintaining, for a first voice mail platform, profile data indicating respectively for each of a plurality of subscribers whether the subscriber subscribes to a mailbox transfer restriction service;

receiving into the first voice mail platform from a first subscriber a request to send a voice message to a second subscriber's voice mail box served by a second voice mail platform;

responsive to the request, the first voice mail platform referencing the profile data to determine whether at least one of the first subscriber and the second subscriber subscribes to the mailbox transfer restriction service;

in response to a determination that the first subscriber subscribes to the mailbox transfer restriction service, the first voice mail server sending a first Session Initiation Protocol (SIP) message over a packet-switched network to a Service Control Point (SCP) that manages call restriction data and including in the first SIP message a Check Restriction header parameter;

the SCP receiving the first SIP message, detecting the Check Restriction header parameter and, responsive to detecting the Check Restriction header parameter, checking the call restriction data to make a determination of whether to allow the requested sending of the voice message to the second subscriber's voice mail box, wherein the determination is to allow the requested sending of the voice message to the second subscriber's mailbox only when the call restriction data indicates that voice calls between the first and second subscriber are allowed; and if the determination is to allow the requested sending of the voice message to the second subscriber's voice mail box, then (i) the SCP sending to the first voice mail platform a second SIP message indicating that the sending is allowed, (ii) the first voice mail platform receiving the second SIP message and responsively communicating with the second voice mail platform to determine whether the second subscriber's voice mail box exists, and (iii) in response to a determination that the second subscriber's voice mail box exists, prompting the first subscriber to speak the voice message, receiving and recording the voice message, and sending the recorded voice message to the second voice mail platform for storage in the second subscriber's voice mail box.

19. The method of claim 18, further comprising:

if the determination is to not allow the requested sending of the voice message to the second subscriber's voice mail box, then (i) the SCP sending to the first voice mail platform a third SIP message indicating that the sending is not allowed, and (ii) the first voice mail platform receiving the third SIP message and responsively providing an announcement to the first subscriber denying the request.

* * * * *